Oct. 5, 1948.　　　　J. A. SAUER　　　　2,450,694
SELF-LOCKING NUT
Filed Jan. 21, 1944
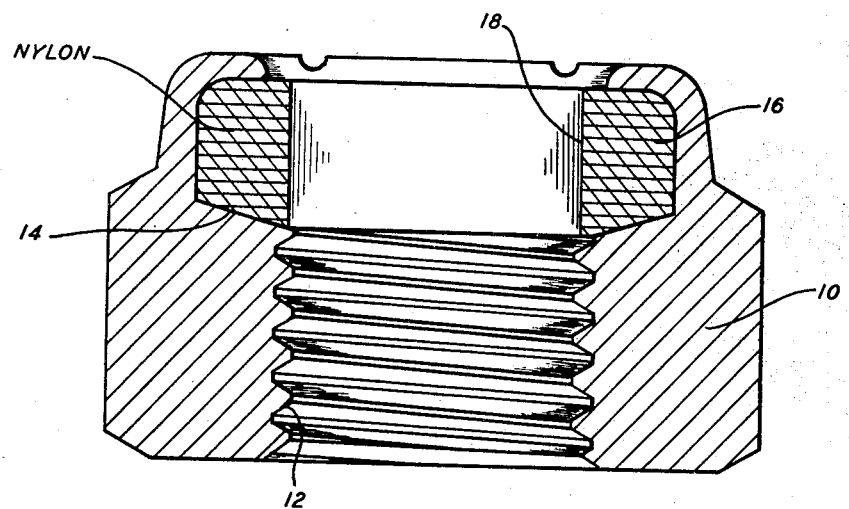
INVENTOR.
John A. Sauer
BY
his ATTORNEY.

Patented Oct. 5, 1948

2,450,694

UNITED STATES PATENT OFFICE 2,450,694

SELF-LOCKING NUT

John A. Sauer, Elizabeth, N. J., assignor to Elastic Stop Nut Corporation of America, Union, N. J., a corporation of New Jersey Application January 21, 1944, Serial No. 519,135

5 Claims. (Cl. 151—7)

The present invention relates to self-locking threaded fastening devices and has particular reference to self-locking nuts. More specifically the invention relates to such devices in which the locking action is obtained by the provision of a body of elastic locking material located so that a thread is impressed therein, in the case of a nut, by the thread of the cooperating bolt. Nuts of this character are disclosed in the Rennerfelt Patent No. 1,550,282, granted August 18, 1925, and Swanstrom Patent No. 2,153,681, granted April 11, 1939.

For the purpose of illustrating the present invention, but without limitation, the accompanying drawing shows a typical nut of the character under consideration, the device comprising a body 10, ordinarily of metal, having a threaded bore portion 12 at one end of which is an annular recess 14 filled by a locking collar 16 of elastic non-metallic material. The bore 18 of the collar 16 is somewhat smaller than the major diameter of the thread 12, so that when the nut is screwed on a bolt, the bolt thread impresses a thread in the collar, the latter being confined, when the nut is applied, between the walls of the recess on the one hand and the threaded wall of the bolt on the other hand. The principal material heretofore commercially employed for such locking collars has been vulcanized fiber. While vulcanized fiber has proved the best material heretofore known for this purpose, it has certain quite well recognized deficiencies. Vulcanized fiber is not waterproof but will absorb more than 50% of its weight of water upon continued immersion, causing the fiber to swell and then shrink again upon drying out. If a nut becomes wet before application to a bolt, the fiber collar has a tendency to be pushed out of place by the bolt, and if it becomes wet and then dry, the collar has a tendency to shrink and become loose and turn in its seat. Fiber does not have as good elastic recovery or spring-back as might be desired after the nut has been removed and as a consequence the nuts cannot be effectively re-used more than a limited number of times. It is found that if a self-locking nut having a fiber collar is taken off and then screwed on to the bolt a second time the frictional locking resistance to removal is appreciably lower than the locking resistance offered by the initial application.

An ideal elastic locking collar for this type of self-locking nut should have the following characteristics: (1) no or very low water absorption; (2) good dimensional stability under varying conditions of temperature and humidity; (3) good elastic recovery so that there is no appreciable reduction in the frictional grip against removal of the nut upon repeated re-use of the nut; (4) resistance to shredding or chipping of the surface of the material when it is turned in contact with the screw threads; and (5) no deleterious effects by changes in temperatures within the temperature range in which the nuts are employed.

I have found materials which are unique and peculiarly adaptable for making such locking collars and which possess to a very high degree the above enumerated properties of an ideal locking material. Such materials are of that class of superpolymeric condensation products of polyamines and polybasic acids derived from diamines and dibasic acids of which hexamethylene diamine and adipic acid are the preferred materials. In order to secure the desired results from the present invention, the synthetic linear superpolymers of such materials, such as are disclosed in the Carothers Patent No. 2,130,948 of September 30, 1938, and of which nylon is a commercial example, are used, and as herein employed the terms defining the material are to be considered in the sense as used and defined in said Carothers patent.

A locking collar of such material has good dimensional stability under varying conditions of humidity. Its water absorptivity is low, having a maximum of about 7 percent, under continued immersion. It has an excellent elastic recovery or spring-back so that there is no appreciable drop in the torsional resistance to removal of the nut even after as many as 50 or 100 re-applications of the nut. It is remarkably tough and shows no appreciable shredding or chipping of the surface as a result of its application to the screw threads. Its locking characteristics are not deleteriously affected by temperatures from —75° F. up to that of 212° F., which covers the temperature range encountered by most lock nut applications.

Self-locking nuts in which my improved locking collars have been substituted for the usual fiber locking collars therefore retain their locking characteristics much better under humid conditions and can be re-used practically indefinitely, as contrasted with the limited re-use of lock nuts having the fiber collars. My locking collars are also less affected by temperatures than those of the usual vulcanized fiber.

An appreciable economy in the manufacture of the collars can be effected since nylon is thermoplastic under high temperatures and the scrap material can be re-worked.

While I have described the preferred embodiment of my invention, it is to be understood that the invention is not so limited but may be otherwise embodied within the scope of the following claims.

I claim:

1. A threaded fastening device comprising means providing a threaded portion for engagement with a threaded element having a complementary thread, means providing a recess in said device for locking material and a body of locking material comprising a synthetic linear superpolymer of a diamine and a dibasic acid in said recess, said body including a portion projecting laterally relative to the axis of said threaded portion past the root diameter of the thread thereof to provide a surface located to be traversed and engaged by said complementary thread to cause displacement of said locking material due to the impression of a thread therein by said complementary thread when said device and element are threaded together, said body of locking material being substantially confined between the walls of said recess and the thread of the element causing said displacement, whereby to create and maintain compressive pressure within said body of locking material to cause the same to grip said complementary thread due to said pressure.

2. A device as set forth in claim 1 in which said body of locking material comprises a superpolymeric condensation product of hexamethylene diamine and adipic acid.

3. A device as set forth in claim 1 in which said body of locking material comprises a synthetic linear superpolymer of a diamine and an acid of the dicarboxylic group.

4. A device as set forth in claim 1 in which said device is provided with a threaded bore for engagement with an element having a complementary external thread.

5. A device as set forth in claim 4 in which said device is in the form of a nut and said body of locking material is in the form of a collar located in a circumferentially continuous recess located at one end of said threaded portion of the device.

JOHN A. SAUER.

REFERENCES CITED

The following references are of record in the file of this patent:

UNITED STATES PATENTS

| Number | Name | Date |
|---|---|---|
| 1,550,282 | Rennerfelt | Aug. 18, 1925 |
| 2,286,336 | Brooke | June 16, 1942 |
| 2,286,668 | Brooke | June 16, 1942 |